United States Patent
Tsay et al.

(10) Patent No.: US 11,237,014 B2
(45) Date of Patent: Feb. 1, 2022

(54) SYSTEM AND METHOD FOR POINT OF INTEREST USER INTERACTION

(71) Applicant: Honda Motor Co., Ltd., Tokyo (JP)

(72) Inventors: Michael Tsay, Irvine, CA (US); Richard Magness, Los Angeles, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 253 days.

(21) Appl. No.: 16/370,382

(22) Filed: Mar. 29, 2019

(65) Prior Publication Data

US 2020/0309556 A1 Oct. 1, 2020

(51) Int. Cl.
*G01C 21/36* (2006.01)
*G01C 21/34* (2006.01)

(52) U.S. Cl.
CPC ...... *G01C 21/3611* (2013.01); *G01C 21/3476* (2013.01); *G01C 21/3661* (2013.01)

(58) Field of Classification Search
CPC ........ G01C 21/00; G01C 21/26; G01C 21/34; G01C 21/3453; G01C 21/3476; G01C 21/36; G01C 21/3605; G01C 21/3611; G01C 21/3661
See application file for complete search history.

(56) References Cited

U.S. PATENT DOCUMENTS

| | | | |
|---|---|---|---|
| 6,559,833 B2 | 5/2003 | Rowe | |
| 7,768,503 B2 | 8/2010 | Chiu et al. | |
| 9,727,231 B2 | 8/2017 | Miller et al. | |
| 9,878,246 B2 | 1/2018 | Oh et al. | |
| 9,886,108 B2 | 2/2018 | Wolff et al. | |
| 10,019,155 B2 | 7/2018 | Takeshi | |
| 10,274,333 B2 * | 4/2019 | Raab | G01C 21/26 |
| 2002/0093539 A1 * | 7/2002 | Os | G06F 3/0482 |
| | | | 715/810 |

(Continued)

FOREIGN PATENT DOCUMENTS

| CN | 1838053 A | 4/2008 |
|---|---|---|
| CN | 204216954 U | 3/2015 |

(Continued)

OTHER PUBLICATIONS

Mullenbach et al. "Reducing Driver Distraction with Touchpad physics", semanticsscholar.org , 2013, pp. 1-60.

(Continued)

*Primary Examiner* — Geepy Pe
*Assistant Examiner* — Michael Allen Brace, Jr.
(74) *Attorney, Agent, or Firm* — Armstrong Teasdale LLP

(57) ABSTRACT

A vehicle infotainment system is provided. The vehicle infotainment system includes a display screen for displaying a plurality of applications and a controller communicatively coupled to the display screen. The controller is configured to display an application on the display screen. The application is divided into a first display region, and a second display region. The controller is further configured to display a plurality of categories on the first display region. The controller is also configured to receive a selection of a category of the plurality of categories. In addition, the controller is configured to display, on the second display region, a plurality of selectable points of interest associated with the selected category.

20 Claims, 5 Drawing Sheets

(56) References Cited

U.S. PATENT DOCUMENTS

| | | | | |
|---|---|---|---|---|
| 2006/0235606 | A1* | 10/2006 | Finn | G01C 21/3611 |
| | | | | 701/426 |
| 2010/0109999 | A1 | 5/2010 | Qui | |
| 2011/0205169 | A1* | 8/2011 | Yasutake | G06F 3/03547 |
| | | | | 345/173 |
| 2011/0291997 | A1 | 12/2011 | Fei | |
| 2013/0147729 | A1 | 6/2013 | Yeon | |
| 2014/0114574 | A1* | 4/2014 | Tertoolen | G01C 21/3676 |
| | | | | 701/533 |
| 2015/0286393 | A1* | 10/2015 | Wild | G06F 3/04886 |
| | | | | 715/771 |
| 2016/0077652 | A1* | 3/2016 | Yang | G06F 3/04886 |
| | | | | 345/174 |
| 2016/0125655 | A1* | 5/2016 | Tian | G06T 19/006 |
| | | | | 345/633 |
| 2017/0219367 | A1* | 8/2017 | Liu | H04W 4/022 |
| 2018/0136902 | A1 | 5/2018 | Feit et al. | |
| 2019/0346930 | A1* | 11/2019 | Beaurepaire | G01C 21/367 |
| 2020/0012389 | A1* | 1/2020 | Mikhaylov | G01C 21/3664 |

FOREIGN PATENT DOCUMENTS

| | | |
|---|---|---|
| JP | 2000187554 A | 7/2000 |
| JP | 2010061224 A | 1/2013 |
| WO | 2006066742 A1 | 6/2006 |
| WO | 2006066715 A2 | 12/2006 |
| WO | 2014029043 A1 | 2/2014 |

OTHER PUBLICATIONS

Norberg et al. "Touchpad as interaction input control for use of In-Vehicle infotainment system", www.trid.trb.org, 2009, pp. 30-31 and 45-66.

Schweinsberg, "Acura Touchpads Aims to Cut Confusion, Distraction", Feb. 2018, http://www.wardsauto.com/interiors/acura-touchpad-aims-cut-confusion-distraction.

Hassel, "Touch screens in cars: Investigating touch gestures and audio feedback in the context of in-vehicle infotainment", muep.mau.se, 2016, pp. 1-48.

Kim et al. "Multimodal Interface Based on Novel HMI UI/UX for In-Vehicle Infotainment System", https://doi.org/10.4218/etrij.15.0114.0076, Aug. 2015, vol. 37, Issue 4, pp. 793-803.

Adams, "Acura Intuitive True Touchpad Interface Infotainment Review: Major Points for Forward Progress", Apr. 23, 2018, http://www.thedrive.com/tech/20341/acura-intuitive-true-touchpad-interface-infotainment-review-major-points-for-forward-progress.

Dearing, "GLC & C class Command Navigation", Jul. 2016, https://www.youtube.com/watch?v=EC8Jz3HxhZk.

Villasenor, "Mercedes_Benz TouchPad howto and review", https://www.youtube.com/watch?v=pY2zKHm75Qo.

Mercedes-Benz USA How To: Navigation Map (Touchpad)—Mercedes-Benz Owner Support, Dec. 2014, https://www.youtube.com/watch?v=EbyYDtmzeq8.

* cited by examiner

SYSTEM AND METHOD FOR POINT OF INTEREST USER INTERACTION

BACKGROUND

The field of the disclosure relates generally to user interaction with points of interest and, more particularly, to systems for use in controlling a user interface to facilitate a user interacting with points of interest.

Generally, known vehicle infotainment systems provide information and entertainment options to occupants of a vehicle. Known infotainment systems may accept user input to control various aspects of the occupant's comfort, such as the vehicle interior climate and/or entertainment. Many of these controls are provided while the vehicle is in motion. However, while a vehicle's driver is accessing these controls, the user's attention is diverted from the road while actively driving. As such, a need exists to provide infotainment controls in a user-accessible manner that enables a user to quickly access desired controls while driving. Moving the controls to a more user-friendly location would facilitate reducing an amount of time that the user's attention is deviated from actively driving.

BRIEF DESCRIPTION

In one aspect, a vehicle infotainment system is provided. The vehicle infotainment system includes a display screen for displaying a plurality of applications and a controller communicatively coupled to the display screen. The controller is configured to display an application on the display screen. The application is divided into a first display region, and a second display region. The controller is further configured to display a plurality of categories on the first display region. The controller is also configured to receive a selection of a category of the plurality of categories. In addition, the controller is configured to display, on the second display region, a plurality of selectable points of interest associated with the selected category.

In another aspect, a method of operating a user interface is provided. The method is implemented on by at least one processor in communication with at least one memory device, a touchpad, and a display screen. The method includes displaying an application on the display screen. The application is divided into a first display region, and a second display region. The method also includes displaying a plurality of categories on the first display region. The method further includes receiving a selection of a category of the plurality of categories. In addition, the method includes displaying, on the second display region, a plurality of selectable points of interest associated with the selected category.

DETAILED DESCRIPTION

Figure 1:
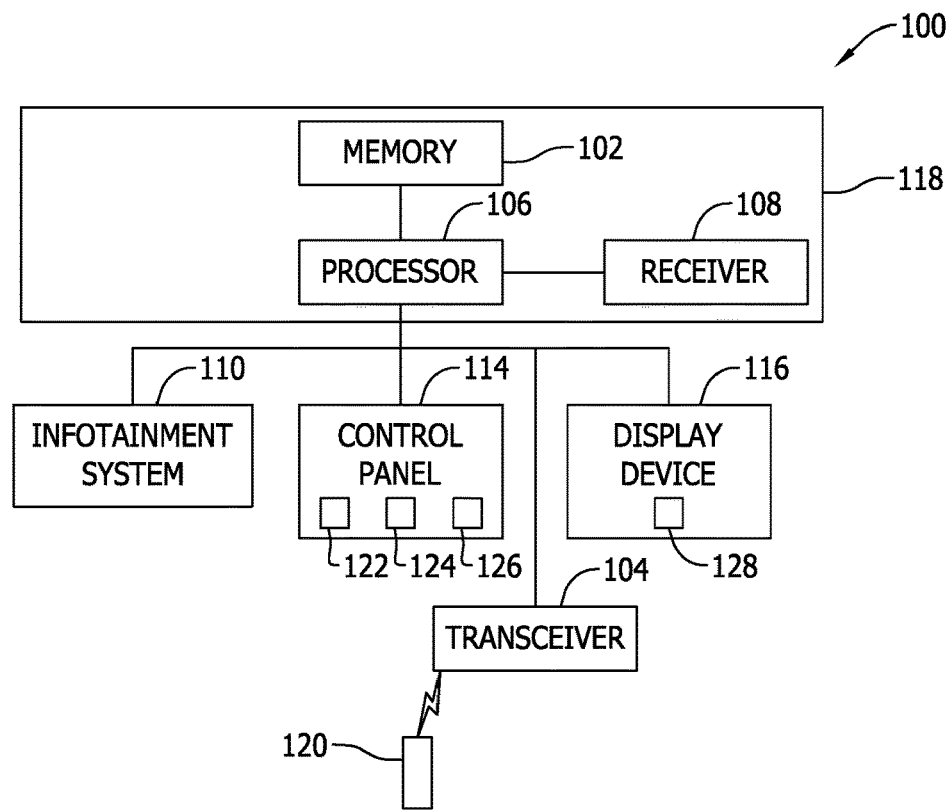
FIG. 1 is a block diagram of an exemplary vehicle control system.

Various embodiments will be better understood when read in conjunction with the appended drawings. To the extent that the figures illustrate the functional blocks of various embodiments, the functional blocks are not necessarily indicative of a division between hardware circuitry. Thus, for example, one or more of the functional blocks (e.g., systems, devices, processors, controllers, and/or memories) may be implemented in a single piece of hardware (e.g., a general purpose signal processor or random access memory, hard disk, or the like) or in multiple pieces of hardware. Similarly, any program may be a stand-alone program, may be incorporated as subroutines in an operating system, may be a function(s) in an installed software package, and/or the like. It should be understood that the various embodiments are not limited to the arrangements and instrumentality shown in the drawings.

Various embodiments of methods and systems for controlling functions of an exemplary vehicle control system, including a vehicle infotainment system, are provided. It should be noted that although the various embodiments are described in connection with the automotive industry, such as for use with an automobile, one or more embodiments may be implemented in different industries and for different applications. Additionally, communication of information used in accordance with one or more embodiments may be performed with different types of communication protocols, as well as using different types of communication lines and communication buses.

FIG. 1 is a block diagram of an exemplary vehicle control system 100. In the exemplary embodiment, the vehicle control system 100 includes a memory 102, a transceiver 104, a processor 106, a receiver 108, a vehicle infotainment system 110, a control panel 114, and a display device 116. In some embodiments, the memory 102, the transceiver 104, the processor 106, and/or the receiver 108 may be included in a computing device, such as a controller 118 for the system 100, which may control or otherwise be communicatively coupled to any other component within the system 100 (e.g., the vehicle infotainment system 110, the control panel 114, and/or the display device 116).

The processor 106 may include one or more conventional electronic processors that interpret and execute instructions. The memory 102 may include a random access memory (RAM), a read-only memory (ROM), and/or another type of dynamic or static storage device that stores information and instructions for execution by the processor 106. The RAM, or another type of dynamic storage device, may store instructions as well as temporary variables or other intermediate information used during execution of instructions by the processor 106. The ROM, or another type of static storage device, may store static information and instructions for the processor 106.

The transceiver 104 may communicate with the processor 106 via a communication line, and may communicate wirelessly or via a wired connection with a portable device 120. The portable device 120 may include a mobile phone or other communication device. In some embodiments, the transceiver 104 may communicate wirelessly with the portable device 120 via a Bluetooth® protocol (Bluetooth is a registered trademark of Bluetooth Sig., Inc. of Bellevue, Wash.). In other embodiments, another wireless protocol may be used. In some embodiments, the transceiver 104 may be included as part of the controller 118.

In the exemplary embodiment, vehicular infotainment system 110 may be used to enable the user to access entertainment options and climate controls for the vehicle (not shown). The vehicle entertainment system 110 may include one or more speakers for playing audio content, as well as one or more controls for controlling audio output from one or more of the speakers. The vehicle infotainment system 110, in some embodiments, includes a rear entertainment system, such that passengers in a rear passenger location of a vehicle may be entertained. The rear entertainment system may include a display screen for displaying video or picture content in combination with audio content, and one or more speakers located at one or more rear passenger locations of the vehicle to play the audio content. In some such embodiments, audio content delivered using the rear entertainment system may be different than audio content delivered to a front portion of the vehicle.

The control panel 114 may communicate with the processor 106 via a communication line to transmit data to/from the control panel 114, such as for control of other modules or systems of the vehicle control system 100. In the exemplary embodiment, the control panel 114 includes, and/or is communicatively coupled to, a touchpad 122, one or more steering wheel keypads 124, and microphone system 126 for receiving an input from a user for control of the vehicle control system 100. Additionally or alternatively, the control panel 114 may include other input mechanisms, such as mechanical buttons or other controls (e.g., knobs, switches, etc.) associated with the touchpad 122 to receive inputs for controlling the vehicle control system 100. The control panel 114 may have a dedicated control module or unit configured to process the control inputs and/or to process the data to be displayed on the display device and/or the touchpad 122. Alternatively, such control functions may be processed by the processor 106 (e.g., as part of the controller 118). The steering wheel keypads 124 may include one or more buttons to allow the user to control the vehicle control system 100. The microphone system 126 may allow the user to control the vehicle control system 100 through audible commands.

In the exemplary embodiment, the touchpad 122 is configured to detect when a finger touches it. The touchpad senses the user's finger movement and downward pressure. In some embodiments, the control panel 114 interprets the user's movements and pressure to determine the user's inputs. In the exemplary embodiment, the touchpad 122 is remote from any display screen 128.

The display device 116 may communicate with the processor 106 via a communication line to transmit data to/from the display device 116, such as for display of various information to the user of the vehicle. In the exemplary embodiment, the display device 116 includes one or more display screens 128 for displaying information to the user. In one embodiment, the display device 116 is separate from the control panel 114, such as located at a different location in the vehicle. For example, the display screens 128 may be selectively positioned for convenient viewing by the user, and the touchpad 122 may be selectively positioned within a comfortable distance from a hand of the user. Each of the multiple display screens 128 may display different icons, graphics, and the like. In an alternative embodiment, the display device 116 is the same as, or is coupled to, the control panel 114. For example, the touchpad 122 is combined with the display screens 128, such as via a touchscreen that functions as both an output device and an input device.

Figure 2:
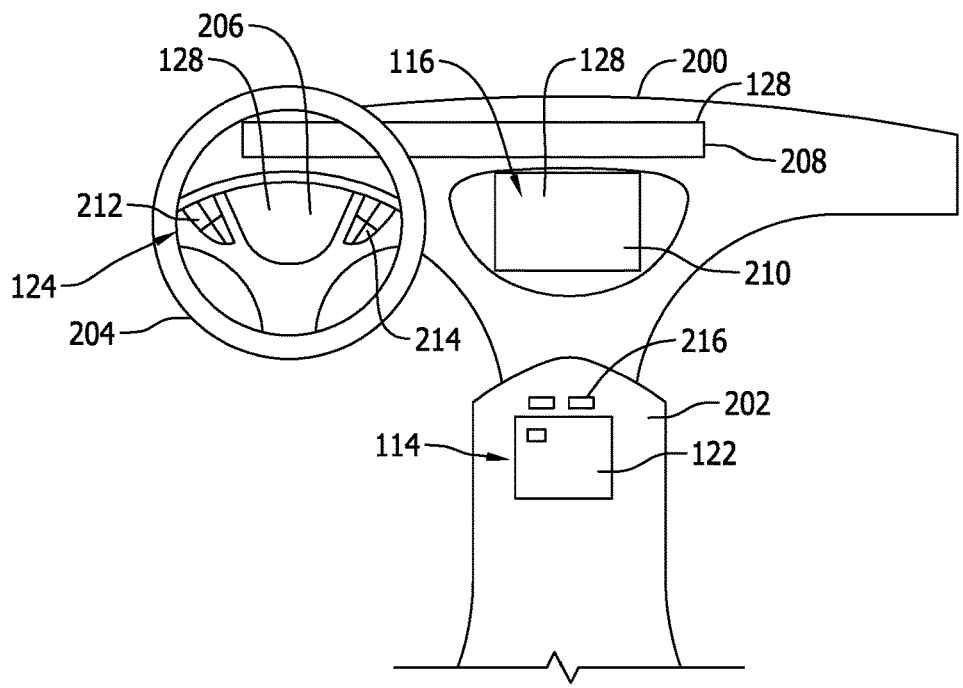
FIG. 2 is a partial schematic view of an exemplary vehicle including the vehicle control system shown in FIG. 1.

FIG. 2 is a partial schematic view of a vehicle including the vehicle control system 100. The vehicle includes a dashboard 200, a center console 202, and a steering wheel 204. In an exemplary embodiment, the display device 116 includes multiple display screens 128, such as, but not limited to, steering wheel display 206, elongated display 208, and additional display 210. A steering wheel display 206 is in the center of the steering wheel 204, such that the user may easily glance down at the information on the steering wheel display 206 without being distracted from operating the vehicle.

An elongated display 208 is at a central portion of the dashboard 200 such that a user, or an operator/driver, of a vehicle may easily view the display screen 128 without being distracted from operating the vehicle. The elongated display 208 may be located close to the user's eye level to enable the elongated display 208 to be viewed peripherally while the user is viewing the roadway ahead. In other embodiments, the elongated display 208 extends along the dashboard 200 such that a portion of elongated display 208 is behind the steering wheel 204. In other embodiments, the elongated display 208 may be at other locations within the vehicle. In another embodiment, the elongated display 208 extends along the dashboard 200 from behind the steering wheel 204 to the right edge of the center console 202. In some of these embodiments, there is an additional display 210 in the center of the dashboard 200 below the elongated display 208. In some embodiments, the steering wheel display 206, elongated display 208, and additional display 210 are display screens 128 and are in communication with display device 116. The elongated display 208 is configured to be divided to provide multiple views and different types of information, such as, but not limited to, navigation, messaging, videos, audio and video communication, music, and others.

The touchpad 122 may be located next to the user of the vehicle. The touchpad 122 is positioned to be easily reachable by the user while operating the vehicle. In some embodiments, the touchpad 122 may be located in a center console area 202 next to the user. The touchpad 122 enables the user to select icons displayed on the display screen 128 and associated functions. In some embodiments, the steering wheel keypads 124 include a left keypad 212 and a right keypad 214, where each keypad 212 and 214 includes one or more buttons. In addition, touchpad 122 may include one or more physical buttons 216 or be positioned proximate to one or more physical buttons 216.

The control panel 114 may be communicatively coupled to the controller 118, which controls the display device 116, or may be communicatively coupled directly to the display device 116 for controlling the controller 118. Furthermore, the control panel 114 may be coupled to various sub-systems of the vehicle control system 100, such as the vehicle infotainment system 110, and the like. For example, the control panel 114, the display device 116 and the components of the sub-systems may be communicatively coupled to the processor 106 (shown in FIG. 1).

Figure 4:
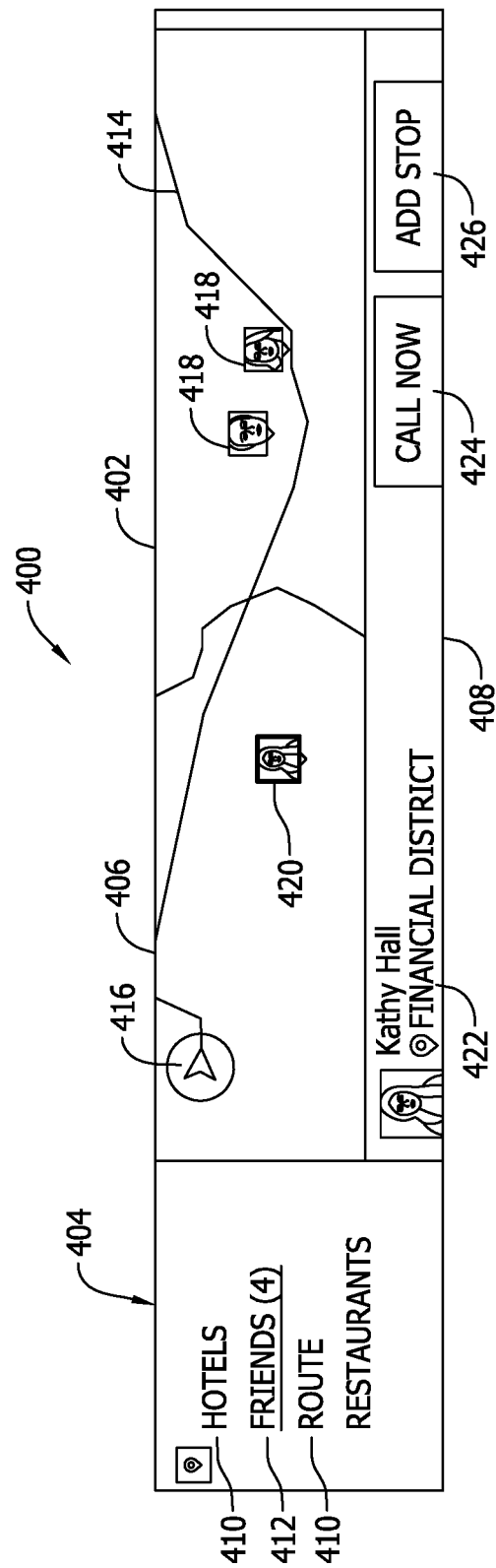
FIG. 4 is a screenshot illustrating a view of an exemplary user interface with points of interest.

The display device 116 may have a home menu or main menu, as shown in FIG. 4, having display icons corresponding to the various sub-systems, such as the vehicle infotainment system 110. The control panel 114 is used to maneuver through the main menu, such as to activate control of one of the sub-systems. For example, the user may touch the touchpad 122 and navigate to activate the various function modes or sources and/or to activate various function controls associated with the modes or sources. Such activation or execution may be performed by selecting a virtual button on the touchpad 122 associated with one of the display icons to activate control of the mode or source associated with such sub-system.

It should be understood that in other exemplary embodiments, the control panel 114 is combined with the display device 116, such that the user interacts with (e.g., touches) the display screen 128 directly to select or otherwise manipulate controls or other content displayed thereon, and that the embodiment of FIG. 2 is illustrative only.

Figure 3:
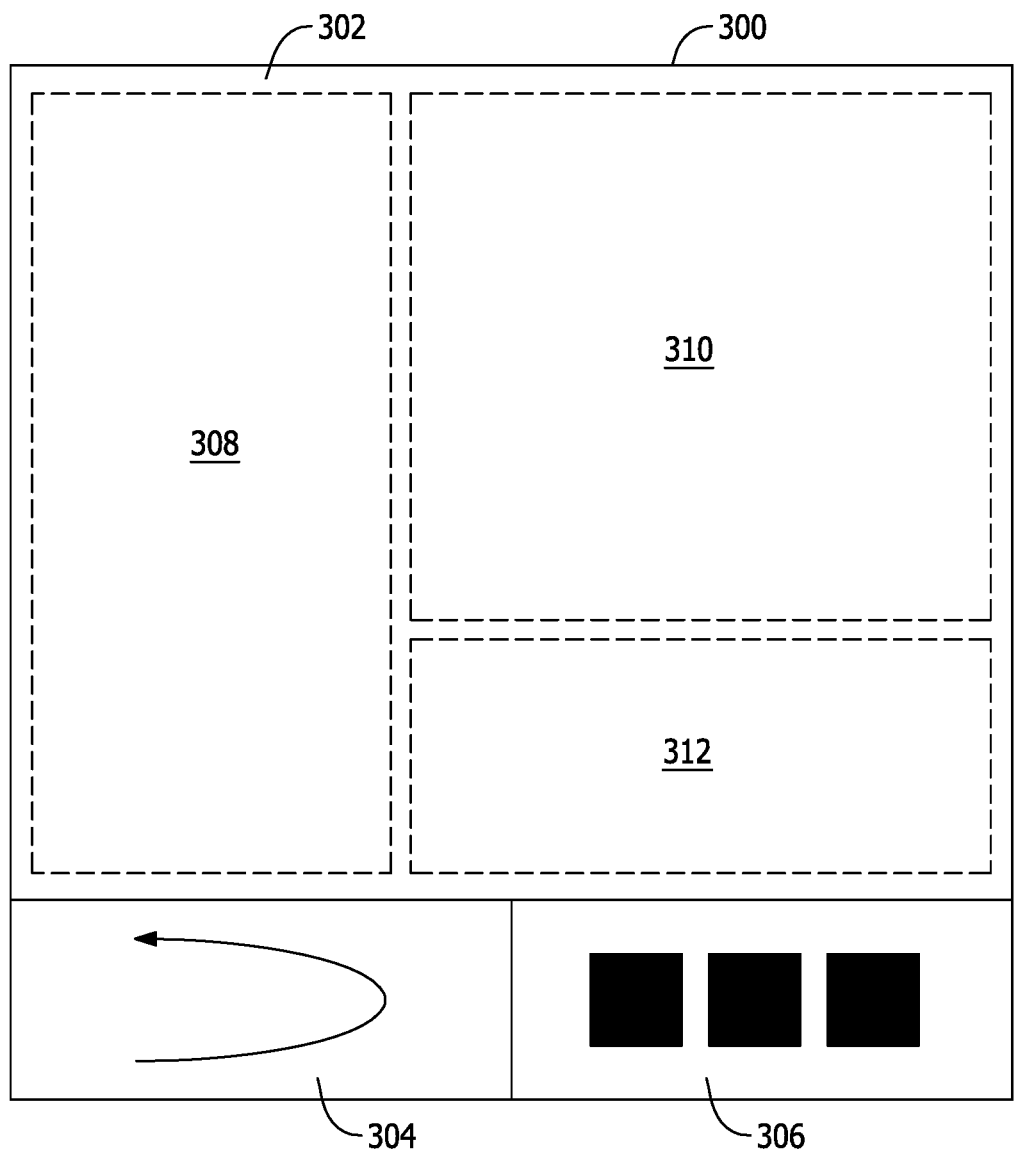
FIG. 3 is an exemplary touchpad that may be used with the vehicle control system shown in FIGS. 1 and 2.

FIG. 3 is an exemplary touchpad 300 including a plurality of regions and buttons. In the exemplary embodiment, touchpad 300 is similar to touchpad 122 (shown in FIG. 1).

In the exemplary embodiment, touchpad 300 includes a touch area 302, a back button 304, and a main menu button 306. In some embodiments, back button 304 and main menu button 306 are physical buttons. In other embodiments, back button 304 and main menu button 306 are virtual buttons and are a part of the touch area 302. In these virtual embodiments, the back button 304 and main menu button 306 may only be available while certain programs or systems are active.

In the exemplary embodiment, touch area 302 is divisible into a first touch portion 308, a second touch portion 310, and a third touch portion 312. In some embodiments, the touchpad 300 includes an integrated display which displays the current configuration of the touch area 302 to provide visual feedback to the user. In the exemplary embodiment, the touch area 302 is only virtually divided into the three areas 308, 310, and 312. In other words, the touch area is not physically divided, but is instead functionally divided into the three touch portions 308, 310, and 312.

In some embodiments, the user may activate back button 304 to return to a previous screen that is being displayed on display screen 128 (shown in FIG. 1) or elongated display 208 (shown in FIG. 2). Moreover, in some embodiments, the user may activate main menu button 306 to return to a main menu screen, such as main menu 800 (shown in FIG. 8) associated with the vehicle infotainment system 110 (shown in FIG. 1).

FIG. 4 is a screenshot illustrating a view 400 of an exemplary user interface 402 with points of interest. In the exemplary embodiment the user interface 402 is displayed on display screen 128 (shown in FIG. 1), for example elongated display 208 (shown in FIG. 2).

When an application is open, such as the navigation application, the area of the display screen 128 that is dedicated to that application is divisible into three regions 404, 406, and 408. In some embodiments, these three display regions are mapped to respective regions 308, 310, and 312 on the touchpad 300 (all shown in FIG. 3). In the exemplary embodiment, the user interface 402 displays a navigation application with points of interest (POI). In other embodiments, the user interface 402 may display different applications with POIs. In some embodiments, the application only displays on a portion of the display screen 128 and other portions of the display screen 128 may continue to display other applications.

In at least one embodiment, the first display portion 404 includes a vertical list of selectable items 410 including one selected item 412. In some embodiments, the selected item 412 is the selectable item 410 that is in the center of first display portion 404. In these embodiments, as the list of selectable items 410 moves up and down, the selected item 412 changes based on which is in the center of the first display portion 404. In other embodiments, the user may tap on a portion of the first touch portion 308 to select a specific item 410.

In the exemplary embodiment, each selectable item 410 is a category, such as, but not limited to, hotels, friends, routes, restaurants, charging stations, and other points of interest that may be traveled to. In these embodiments, the user may adjust the categories by adding, removing, or editing the associated POIs associated with the category. For example, the user may create a category to only display restaurants that serve pizza, or have a category for work friends and one for school friends. In some embodiments, these categories may be stored in the vehicle infotainment system 110. In other embodiments, these categories may be stored on an attached portable device 120 (shown in FIG. 1).

In the exemplary embodiment, the second display portion 406 displays a map with a route 414 and a current (or starting) location 416. The second display portion 406 also displays points of interest (POI) 418 and a selected POI 420. The POIs 418 are associated with the selected item 412 in the first display portion 404.

As shown in view 400, the selected item 412 is labeled "FRIENDS" and each of the POIs 418 and the selected POI 420 are different individuals that are labeled as friend by the user. In the case of 'friends', the location of each of the 'friend' POIs 418 and 420 may either be a home location or a current location of the individual.

In the exemplary embodiment, the user may also select a POI 418 by sliding a finger from one side of region 310 towards the other side of region 310 to select the next POI 418 in order. For example, the user may move its finger to the right and the next POI 418 to the right of the currently selected POI 420 will become the selected POI 420. In some embodiments, the system 100 determines which POI 418 to display based on the distance between the POI 418 and the present route 414. In other embodiments, the system 100 only displays a portion of the route 414 and thus only displays those POIs 418 associated with the displayed portion of the route 414. In other embodiments, the user may select a POI 418 either by tapping on the location of the POI 418 on a corresponding location on the touchpad 300.

In the exemplary embodiment, the third display portion 408 displays information 422 about the selected POI 420 and one or more selectable options 424 and 426 associated with the selected POI 420. The selectable options 424 and 426 may be selected by having the user touch the corresponding area on the third touch portion 312 or the display screen 128. When selected, the selectable items 424 and 426 activate one or more functions, such as calling 424 the selected POI 420 or adding the location of the selected POI 420 as a stop 426 on the route 414.

In some embodiments, the user may use back button 304 (shown in FIG. 3) to close the navigation application and return to a previously displayed screen. In some embodiments, the user may use the main menu button 306 (shown in FIG. 3) to close the active application and open a main menu, such as a main menu 800 (shown in FIG. 8) associated with the vehicle infotainment system 110 (shown in FIG. 1).

Figure 5:
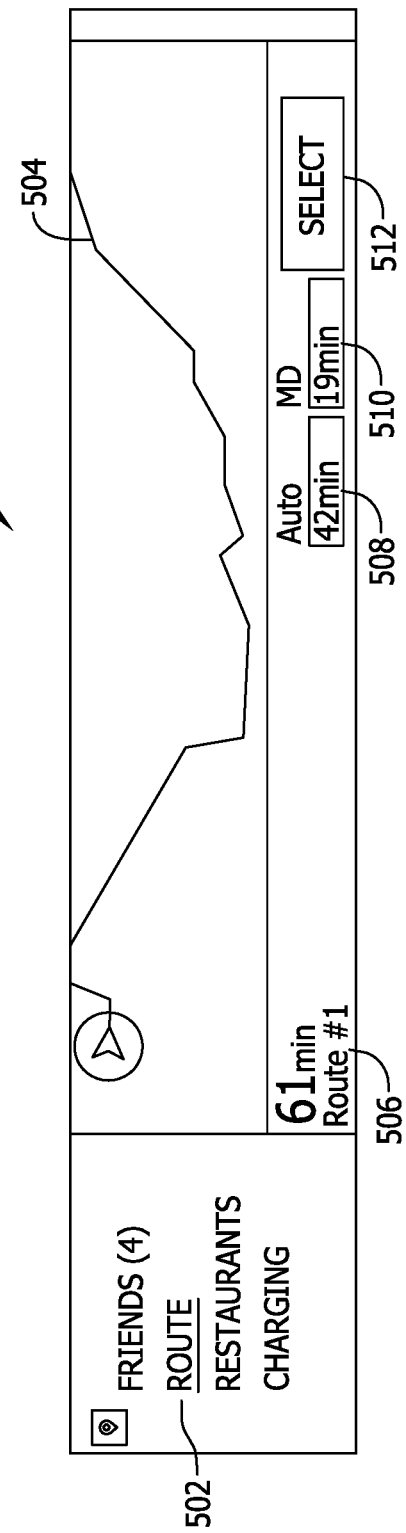
FIG. 5 is a screenshot illustrating another view of an exemplary user interface with points of interest.

FIG. 5 is a screenshot illustrating another view 500 of the exemplary user interface 402 (shown in FIG. 4) with points of interest. View 500 displays when "ROUTE" is the selected item 502. In this embodiment, the user may select from one or more routes 504 shown in the second display portion 406. The user may select a route 504 by sliding a finger to the left or right, or by tapping on the desired route 504, either on the display screen 128 or the touchpad 122 (both shown in FIG. 1).

When a route 504 is selected, then the third display portion 408 (shown in FIG. 4) displays information 506 about the route 504. In some embodiments, such as where the vehicle may be able to be operated in an auto drive mode and a manual drive mode, the third display portion 408 may display an auto drive distance of the route 508 and a manual drive distance of the route 510. The third display portion 408 may display one or more selection option 512 to allow the user to interact with the route 504 to determine whether or not the user chooses that route.

Figure 6:
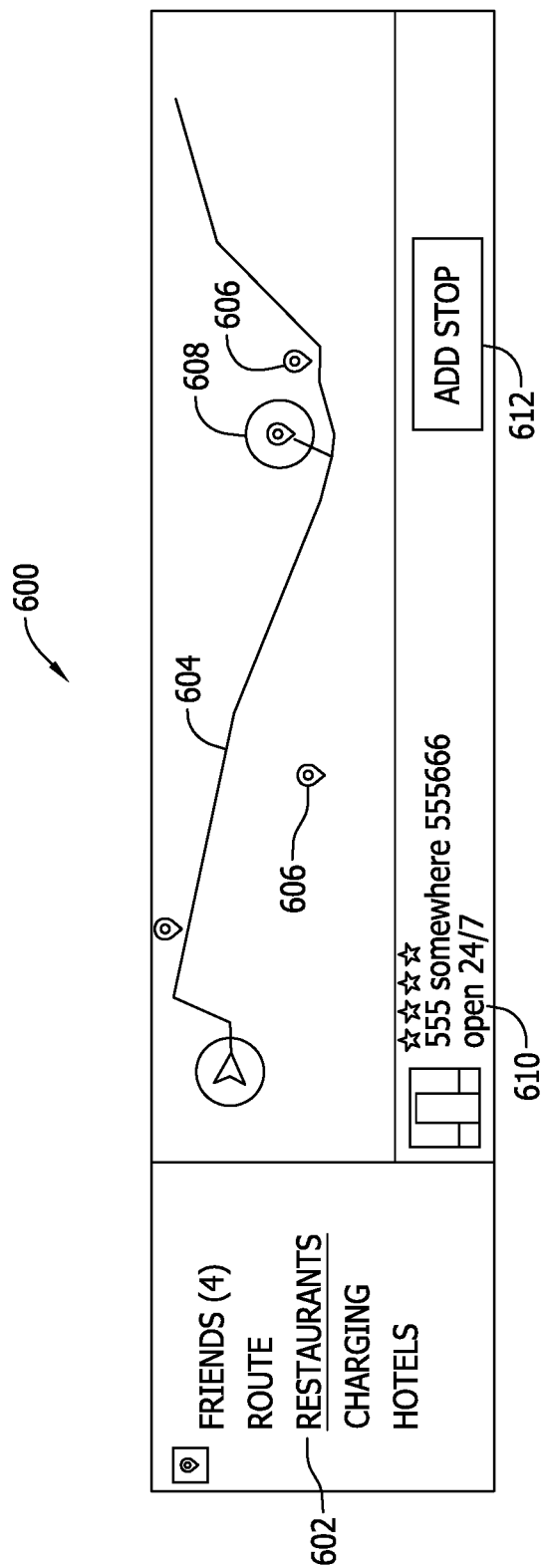
FIG. 6 is a screenshot illustrating a further view of an exemplary user interface with points of interest.

FIG. 6 is a screenshot illustrating a further view 600 of the exemplary user interface 402 (shown in FIG. 4) with points of interest. View 600 displays when "RESTAURANTS" are the selected item 602. In this embodiment, the second display portion 406 (shown in FIG. 4) displays a current route 604, one or more points of interest (POI) 606, and a selected POI 608. The second display portion 406 displays the route 604 connecting to or leading to the selected POI 608. The user may select a POI 606 by moving its finder to the left or right, or by tapping on the desired POI 606, either on the display screen 128 or the touchpad 122 (both shown in FIG. 1).

When a POI 606 is selected, then the third display portion 408 (shown in FIG. 4) display information 610 about the selected POI 608. The third display portion 408 may also display the option 612 to add the selected POI 608 as a stop along the route 604.

Figure 7:
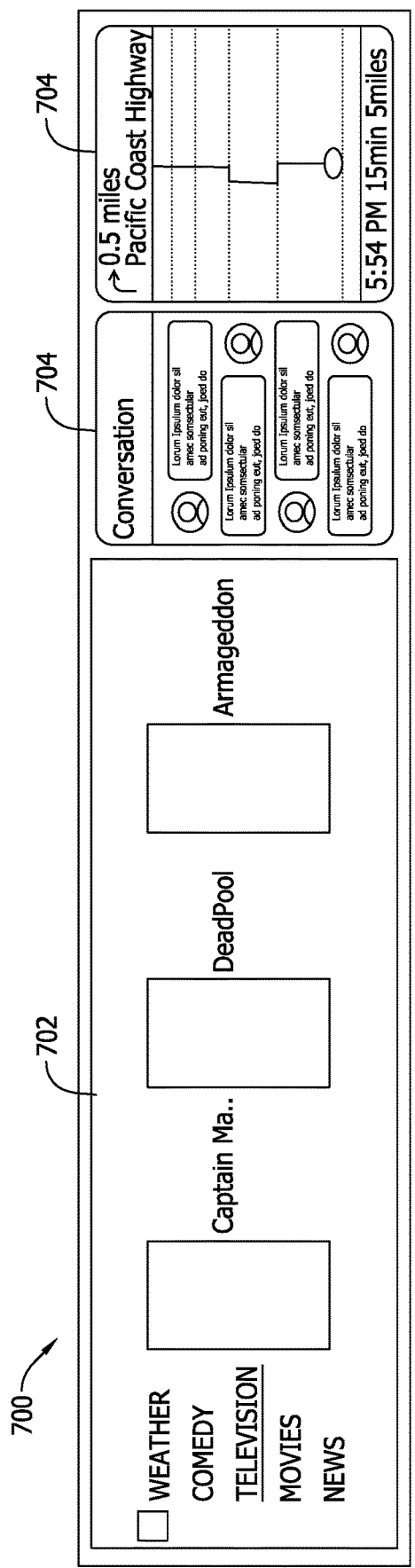
FIG. 7 illustrates an exemplary user interface with interactive and non-interactive applications.

FIG. 7 illustrates an exemplary user interface 700 with interactive 702 and non-interactive applications 704. In the exemplary embodiment, the user may only interact with one active application at a time. This is the interactive application 702. Other applications may be active, but in a mode, where the user is unable to interact with them. In these embodiments, the touchpad 300 is mapped to the portion of the elongated display 208 that displays the interactive application 702, such that the user is unable to interact with the other applications until the interactive application 702 is closed. For example, a user may browse a selection of applications using the touchpad 300. When the user selects an application, that application becomes the interactive application 702 and the touchpad 300 is hard mapped to the display of that application.

Figure 8:
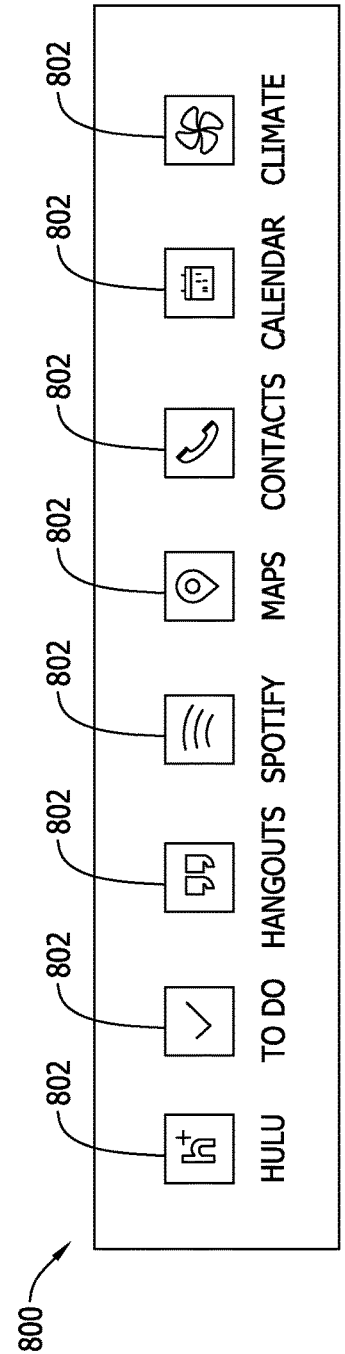
FIG. 8 illustrates an exemplary user interface of a main menu.

FIG. 8 illustrates an exemplary user interface 800 of a main menu. In the exemplary embodiment, the main menu may be reached by pressing the main menu button 306 shown in FIG. 3. The main menu displays a plurality of applications 802 that a user may choose. In the exemplary embodiment, the user may use the touchpad 300 (shown in FIG. 3) to select an application to activate. In some embodiments, the touchpad allows the user to scroll through the applications 802. In some of these embodiments, the display screen 128 highlights an individual application 802 that will be selected if the user taps on the touchpad 300. In other embodiments, the area of the touchpad 300 is directly mapped to the entire user interface 800 and the user is able to select an application 802 by tapping the touchpad 300 in a location relative to the location of the desired application 802 on the user interface 800.

While the above embodiments describe using a navigation application, the systems described herein may also be used with other application, such as, but not limited to, a phone calling application, a messaging application, a video streaming application, and a music application.

Embodiments of the touchpad and display interaction systems described herein facilitate increasing the flexibility and ease of use of interacting with a display screen. The systems described herein provide enhanced communication between the user and the display screen, without requiring the user to lean forward to interact with the information displayed on the display screen.

The methods and system described herein may be implemented using computer programming or engineering techniques including computer software, firmware, hardware, or any combination or subset. Some technical problems with known systems include (a) a need to facilitate communicating information effectively a user, such as a driver; (b) increasing variability and flexibility in how information is displayed to the user; and (c) standardizing how the user interacts with applications to reduce the amount of concentration required to activate these systems. Embodiments of the systems and methods described herein address such technical problems. The technical effect of at least some embodiments of the systems and processes described herein is achieved by performing at least one of the following steps: (a) displaying an application on the display screen, wherein the application is divided into a first display region, and a second display region; (b) displaying a plurality of categories on the first display region; (c) receiving a selection of a category of the plurality of categories; and (d) displaying, on the second display region, a plurality of selectable points of interest associated with the selected category. The resulting technical effect provides enhanced communication between the user and the display screen, without requiring the user to lean forward to interact with the information displayed on the display screen.

In some embodiments, the technical effect is also achieved by: (e) displaying a map in the second display region; (f) receiving from a user a selection of one of the plurality of selectable points of interest; (g) displaying a travel route on the second display region; (h) adjusting the displayed travel route based on the selected point of interest; (i) displaying a third display region associated with the application, wherein the third display region displays information associated with the selected point of interest; (j) displaying, in the third display region, one or more selectable options associated with the selected point of interest, wherein when selected the one or more selectable options activate one or more functions of the application; (k) receiving a user input including a horizontal direction; (l) determining which of the plurality of selectable points of interest is next in that horizontal direction; and (m) displaying the determined point of interest as the selected point of interest.

One or more embodiments include a system, which may be implemented as a programmable logic controller (PLC), also referred to as a programmable logic circuit or simply "controller," that controls various functions and operations of the vehicle, such as a vehicle infotainment system and the like. The controller may control display functions on one or more display devices or screens. The controller may monitor, receive, detect, interpret, and/or transmit one or more inputs or outputs between a display device and a control panel. Moreover, the controller may receive, detect, monitor, and/or transmit signals from other components of the vehicle control system, including sensors and actuators.

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

This written description uses examples to disclose the various embodiments, and also to enable a person having ordinary skill in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal language of the claims.

What is claimed is:

1. A vehicle infotainment system comprising:
   a display screen for displaying a plurality of applications, wherein the display screen is elongated in a horizontal orientation;
   a touchpad for facilitating a user interacting with the display screen, wherein the touchpad is separate from the display screen; and
   a controller communicatively coupled to the display screen, wherein the controller is configured to:
      display an application on the display screen, wherein the application is divided into a first display region, and a second display region;
      display a plurality of categories vertically on the first display region, wherein each category of the plurality of categories is associated with a plurality of points of interest;
      display a travel route on the second display region;
      determine a first category of the plurality of categories where the first category is currently selected on the display screen;
      display, on the second display region, a first plurality of selectable points of interest associated with the first category, wherein the first plurality of selectable points of interest are displayed along the travel route;
      receive a first user input from the user via the touchpad, wherein the first user input includes movement in a vertical direction;
      determine a selection of a second category of the plurality of categories based on the first user input;
      display, on the second display region, a second plurality of selectable points of interest associated with the second category, wherein the second plurality of selectable points of interest are displayed along the travel route;
      receive a second user input from the user via the touchpad, wherein the second user input includes movement in a horizontal direction;
      determine a selection of one of the second plurality of selectable points of interest based on the second user input; and
      adjust the displayed travel route based on the selected point of interest.

2. The vehicle infotainment system in accordance with claim 1, wherein the application is a navigation application, and wherein the controller is further configured to display a map in the second display region.

3. The vehicle infotainment system in accordance with claim 1, wherein the controller is further configured to display a third display region associated with the application, wherein the third display region displays information associated with the selected point of interest.

4. The vehicle infotainment system in accordance with claim 3, wherein the controller is further configured to display, in the third display region, one or more selectable options associated with the selected point of interest, wherein when selected the one or more selectable options activate one or more functions of the application.

5. The vehicle infotainment system in accordance with claim 4, wherein the controller is further configured to place a call to the selected point of interest in response to a user activating one of the one or more selectable options.

6. The vehicle infotainment system in accordance with claim 4, wherein the controller is further configured to:
   add the selected point of interest as a stop on the travel route in response to a user activating one of the one or more selectable options.

7. The vehicle infotainment system in accordance with claim 1, wherein the controller is further configured to:
   receive the second user input including the horizontal direction;
   determine which of the second plurality of selectable points of interest is next in that horizontal direction along the displayed travel route; and
   display the determined point of interest as the selected point of interest.

8. The vehicle infotainment system in accordance with claim 2, wherein the controller is further configured to:
   display, in the second display region, a plurality of routes;
   receive a user selection of one of the routes of the plurality of routes; and
   display the selected route.

9. The vehicle infotainment system in accordance with claim 1, wherein the controller is further configured to:
   determine the selection of the second category of the plurality of categories based on the first user input;
   remove, from display in the second display region, the first plurality of selectable points of interest associated with the first category; and
   add, to display in the second display region, the second plurality of selectable points of interest associated with the second category.

10. A method of operating a user interface, the method implemented on by at least one processor in communication with at least one memory device, a touchpad, and a display screen, wherein the touchpad is separate from the display screen, wherein the display screen is elongated in a horizontal orientation, and wherein the method comprises:
   displaying an application on the display screen, wherein the application is divided into a first display region, and a second display region;
   displaying a plurality of categories vertically on the first display region, wherein each category of the plurality of categories is associated with a plurality of points of interest;
   displaying, on the display screen, a travel route on the second display region;
   determining, by the at least one processor, a first category of the plurality of categories where the first category is currently selected on the display screen;
   displaying, on the second display region of the display screen, a first plurality of selectable points of interest associated with the first category, wherein the first plurality of selectable points of interest are displayed along the travel route;

receiving, from a user via the touchpad, a first user input, wherein the first user input includes movement in a vertical direction;

determining a selection of a second category of the plurality of categories based on the first user input;

displaying, on the second display region of the display screen, a second plurality of selectable points of interest associated with the second category, wherein the second plurality of selectable points of interest are displayed along the travel route;

receiving, from the user via the touchpad, a second user input, wherein the second user input includes movement in a horizontal direction;

determining, by the at least one processor, a selection of one of the second plurality of selectable points of interest based on the second user input; and adjusting the displayed travel route based on the selected point of interest.

11. The method in accordance with claim 10, wherein the application is a navigation application, and wherein the method further comprises displaying a map in the second display region.

12. The method in accordance with claim 10 further comprising displaying a third display region associated with the application, wherein the third display region displays information associated with the selected point of interest.

13. The method in accordance with claim 12 further comprising displaying, in the third display region, one or more selectable options associated with the selected point of interest, wherein when selected the one or more selectable options activate one or more functions of the application.

14. The method in accordance with claim 10 further comprising:

receiving the second user input including the horizontal direction;

determining which of the second plurality of selectable points of interest is next in that horizontal direction along the displayed travel route; and displaying the determined point of interest as the selected point of interest.

15. The method in accordance with claim 11 further comprising:

displaying, in the second display region, a plurality of routes;

receiving a user selection of one of the routes of the plurality of routes; and displaying the selected route.

16. The method in accordance with claim 10 wherein the method further comprises:

determining the selection of the second category of the plurality of categories based on the first user input;

removing, from display in the second display region, the first plurality of selectable points of interest associated with the first category; and adding, to display in the second display region, the second plurality of selectable points of interest associated with the second category.

17. The vehicle infotainment system in accordance with claim 1, wherein the travel route is displayed in the second display region traveling in the horizontal direction.

18. The vehicle infotainment system in accordance with claim 1, wherein the travel route is displayed connected to the selected point of interest.

19. The method in accordance with claim 10, wherein the method further comprises displaying the travel route in the second display region traveling in the horizontal direction.

20. The method in accordance with claim 10 further comprising displaying the travel route connected to the selected point of interest.

* * * * *